United States Patent

Keller

[15] 3,678,300

[45] July 18, 1972

[54] MONOLITHIC INTEGRABLE FLIP FLOP CIRCUIT

[72] Inventor: Hans Keller, Freiburg, Germany

[73] Assignee: ITT Industries, Inc., New York, N.Y.

[22] Filed: Oct. 19, 1970

[21] Appl. No.: 81,710

[30] Foreign Application Priority Data

Dec. 17, 1969 Germany ......................P 19 63 225.8

[52] U.S. Cl. ..............................307/288, 307/291, 307/303

[51] Int. Cl. ......................................................H03k 3/286

[58] Field of Search ..................307/288, 289, 291, 292, 303

[56] References Cited

UNITED STATES PATENTS

| | | | |
|---|---|---|---|
| 2,885,574 | 5/1959 | Roesch, Jr. | 307/291 |
| 3,178,584 | 4/1965 | Clark | 307/291 |

*Primary Examiner*—John Zazworsky

*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A monolithic integrable flip-flop circuit provides for information storage and reliable switchover by inserting a transistor between the base and collector of the control transistor of the flip-flop.

12 Claims, 8 Drawing Figures

INVENTOR

HANS KELLER

BY Stephen A. Frany

ATTORNEY

INVENTOR

HANS KELLER

BY Stephen A. Young

ATTORNEY

INVENTOR

HANS KELLER

BY Stephen A. Young

ATTORNEY

MONOLITHIC INTEGRABLE FLIP FLOP CIRCUIT

BACKGROUND OF THE INVENTION

The present invention relates to a monolithic integrable bistable flip-flop circuit consisting of two halves which are designed in the same way, each comprising a switching transistor and a control transistor of the same conductivity type, with the collectors thereof as well as the emitters thereof being connected together and applied to reference potential. The base of the switching transistor associated with the one flip-flop half is connected to the collector of the switching transistor associated with the other flip-flop half, via an operating resistor applied to operating voltage, and the base electrodes of the control transistors are connected to a common control input via respective coupling capacitors.

Accordingly, this flip-flop circuit consists of two NOR-stages each with two inputs of which respectively the one input (the base electrode of the switching transistor) is connected to the output (the collector electrode of the switching transistor) of the other stage. The second input (the base electrode of the control transistor) is connected via a capacitor, to the control input respectively.

In order to provide for a reliable switchover of this type of flip-flop circuit when triggered by input pulses, the information relating to the former switching condition is stored in the capacitors.

As is evident from French Pat. No. 1,548,137, this can be accomplished in that both the output and the control input of each flip-flop half are coupled together by a resistor. Since this coupling resistor must have a relatively high value to provide the storage function, a large surface portion of a semiconductor body must be used for its fabrication within a monolithic integrated circuit.

Instead of the ohmic resistors, it is also possible to use semiconductor diodes. However, the forward voltage of these diodes must be as low as possible, and at least lower than the base-emitter threshold voltage of the control transistors. When using a circuit employing individual components, this is accomplished by using different semiconductor materials for the transistors and the diodes. Thus, it is possible to use silicon as the semiconductor material for the transistors, and germanium as the semiconductor material for the diodes, wherein the forward voltage drop of the emitter base diode of a silicon transistor is approximately 0.6 volts and the forward voltage drop of a germanium diode is approximately 0.3 volts.

Since all of the components and structures within the monolithic body are made from the same material, the fabrication of diodes having lower forward voltage drops than the emitter base diodes of transistors is impractical.

SUMMARY OF THE INVENTION

It is the object of the present invention to design the aforementioned bistable flip-flop circuit within a monolithic integrated circuit which provides for reliable switchover from one state to the next.

According to a broad aspect of the invention the collector and emitter of a complementary auxiliary transistor is respectively connected to the base and collector of the control transistor of each flip-flop half, and the base of the complementary auxiliary transistor is coupled either to ground potential or the base of the respective switching transistor of each flip-flop half.

DESCRIPTION OF THE PREFERRED EMBODIMENTS

Figure 1:
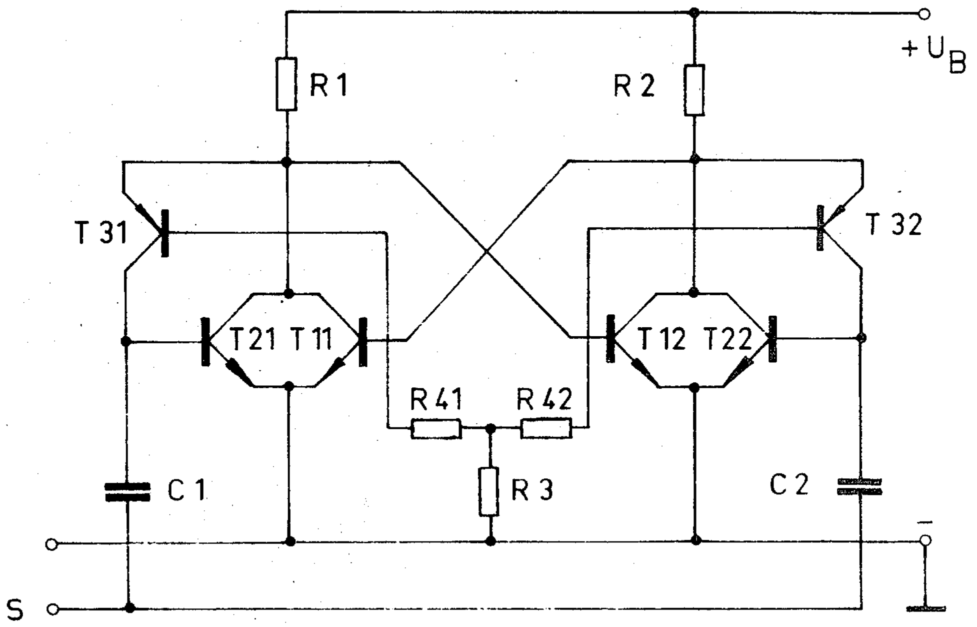
FIG. 1 shows a basic circuit diagram of the inventive circuit.

The flip-flop circuit according to FIG. 1 consists of two symmetrical halves, each of which contains the respective switching transistors T11 and T12 and the respective control transistor T21 and T22 with the collectors thereof being connected to one another, and with the emitters thereof also being connected to one another. The parallel-connected collectors are applied, via the respective operating resistors R1 and R2 to the operating voltage $+U_B$, and the parallel-connected emitters are applied to reference potential. This configuration, hence one flip-flop half, as already mentioned hereinbefore, represents a NOR-circuit wherein the base electrodes of both the control transistor and the switching transistor, serve as the two inputs of the NOR-stage, and the output is taken from the parallel-connected collector electrodes.

The base of the switching transistor of the one flip-flop half is connected to the parallel-arranged collector of the other flip-flop half. Between the control terminal S and the base electrode of the control transistors T21, T22 of each flip-flop half, there is arranged respective capacitors C1 and C2, through which the input pulses are coupled to respective flip-flop stage.

For achieving a reliable switchover from one state to the other state of the flip-flop circuit, two complementary auxiliary transistors T31 and T32 are used to insure that the information relating to the former switching condition is stored for a certain period of time as a charge difference at the capacitors C1 and C2. The collector of each of the auxiliary transistors T31 and T32 is connected to the base of the associated respective control transistors T21 and T22. The emitter of each auxiliary transistor is connected to the collector of the associated respective switching transistors T11 and T12.

The base electrode of each auxiliary transistor is applied, via at least one resistor, to reference (ground) potential. In so doing, it is possible in accordance with a further embodiment of the invention, to connect with one another either the base electrodes of the two auxiliary transistors T31 and T32, and to apply them, via the common resistor R3, to reference potential, or to connect each of the base electrodes with one another by inserting one resistor R41 and R42 respectively, and to connect them to reference potential via the common resistor R3, or to apply each of the base electrodes, via each time one resistor R41 or R42, directly to reference potential respectively.

Figure 2:
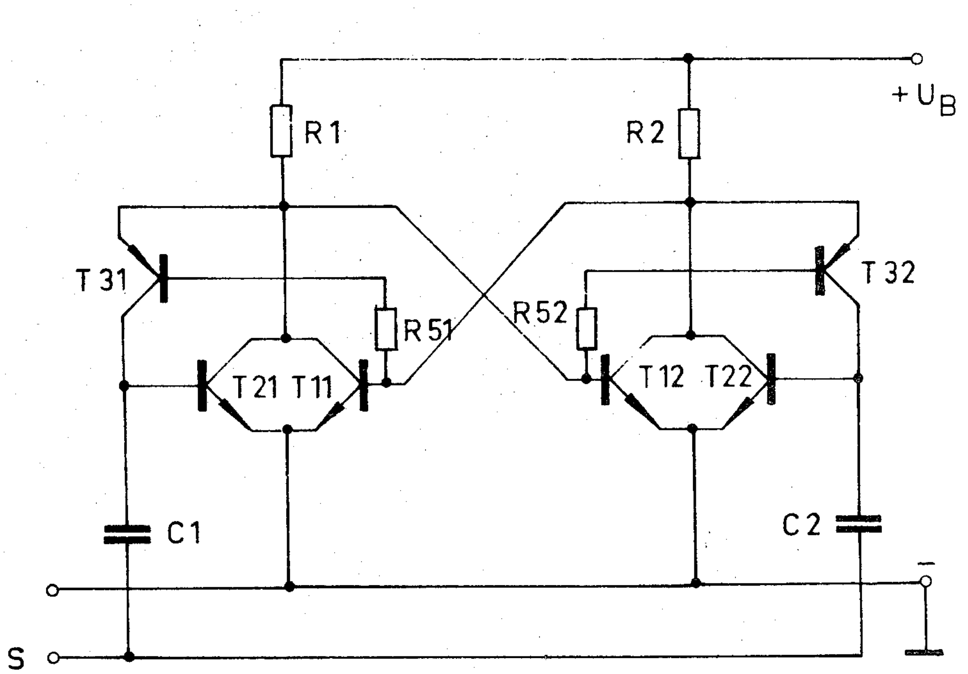
FIG. 2 shows another basic circuit diagram of the inventive circuit.

The flip-flop circuit shown in FIG. 2 differs from the one shown in FIG. 1 in that the base electrodes of each of the auxiliary transistors T31 and T32, either directly or via respective resistors R51 and R52, are connected to the base electrodes of the associated switching transistors T11 and T12. Since in the circuit according to FIG. 1, the auxiliary transistor base electrodes are coupled to a constant reference potential, they are controlled by the output pulses produced by the switching over of the flip-flop circuit.

The mode of operation of the flip-flop circuit according to FIG. 2 will now be explained in detail as follows:

It is assumed that the flip-flop circuit is in such a stable condition that the switching transistor T11 is driven into saturation and, consequently, the switching transistor T12 is in the non-conductive state. In that case, the auxiliary transistor T31 is likewise blocked or rendered non-conductive, and the auxiliary transistor T32 is in the active state. As long as no input signal appears at S, the capacitor C1 is discharged, whereas the capacitor C2 is charged to some 100 millivolts via the auxiliary transistor T32. Accordingly, the information concerning this particular circuit or switching condition of the flip-flop circuit is unambiguously stored across the two capacitors.

If now a control signal with a positive voltage step is applied to the control input S then, owing to the already existing charging of the capacitor C2, a current will flow into the base of control transistor T22 already at a time position at which the amplitude of the positive voltage step has not yet reached the threshold voltage value of the control transistor T21. Owing to this, the control transistor T22 is unblocked temporarily, and the switching transistor T11 is blocked. Accordingly, owing to the feedback existing in the circuit, the switching transistor T12 is likewise unblocked, in other words: the flip-flop circuit changes into its other stable state.

On principle, the mode of operation of the circuit according to FIG. 1 is the same, because also in this case one of two capacitors has a different charge than the other one, so that the information relating to the switching or circuit condition of the flip-flop is stored in the capacitors.

In cases where the capacitors C1 and C2 are likewise to be included in the monolithic component, this may be effected, in accordance with a further embodiment of the invention, in the different ways as described hereinafter. In the present case there will thus result some particularly favorable embodiments.

For the sake of simplicity, each time only one of the two flip-flop halves is shown in FIGS. 3 to 8, and the other half is built up identically, and is "crosswisely" connected to the shown half, as already described hereinbefore.

Figure 3:
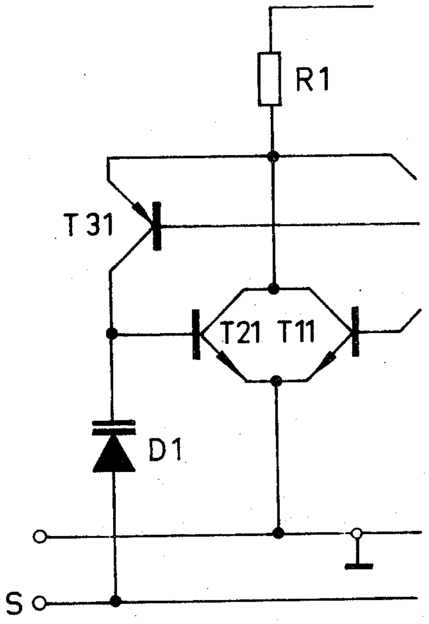
FIGS. 3 and 4 both show the replacement of a coupling capacitor by a diode.

Both the capacitors C1 and C2 may be realized by using PN-junctions operated in the forward or reverse direction. Thus, FIG. 3 shows a diode D1 connected in the forward direction between the control input S and the base of the control transistor. It is particularly advantageous to design these diodes as transistors connected as diodes in the monolithic circuit.

Figure 4:
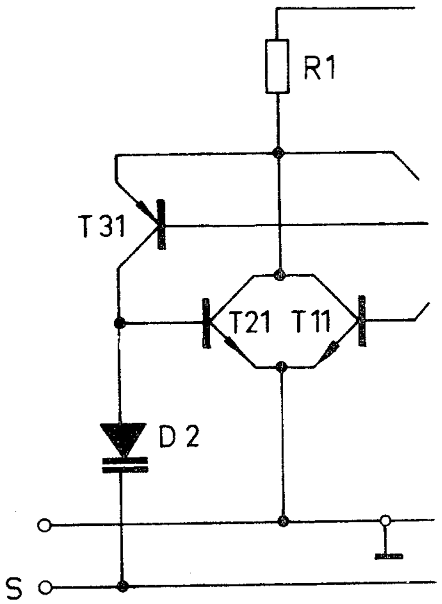

FIG. 4 shows a diode D2 which is connected in the reverse direction between the control terminal or input S and the control transistor base electrode. Also to this end, transistors connected as diodes can be used in order to achieve a particularly advantageous effect.

Figure 5:
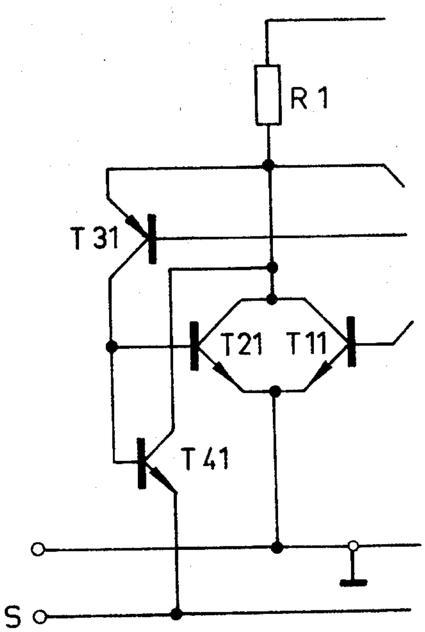
FIG. 5 shows the replacement of a coupling capacitor by a transistor.

Instead of such transistors connected as diodes, however, it is also possible to employ transistors operated as transistors. Thus, it is shown in FIG. 5, how the capacitor C1 of FIGS. 1 and 2 is replaced by a coupling transistor T41, being of the same conductivity type as the control and the switching transistors. This coupling transistor T41 is connected in such a way that its emitter is applied to the control input S, and that its base and collector electrodes are connected in parallel to the respective base and collector electrodes of the control transistor T21.

Figure 6:
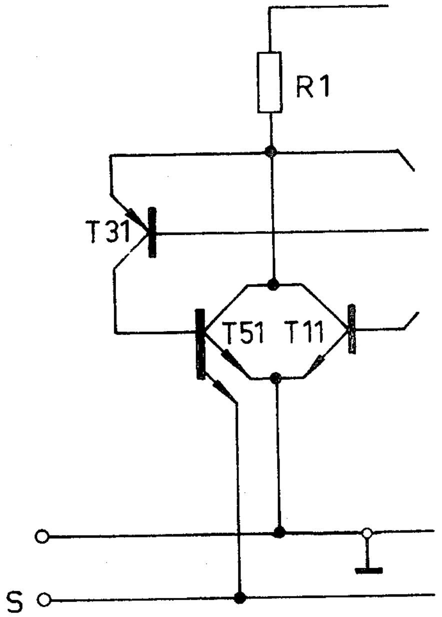
FIG. 6 shows a further embodiment of the circuit according to FIG. 5.

In the case of a monolithic integration of the circuit according to FIG. 5, both the coupling transistor T41 and the control transistor T21 can be advantageously combined to form one double-emitter transistor T51, as is shown in FIG. 6.

Figure 7:
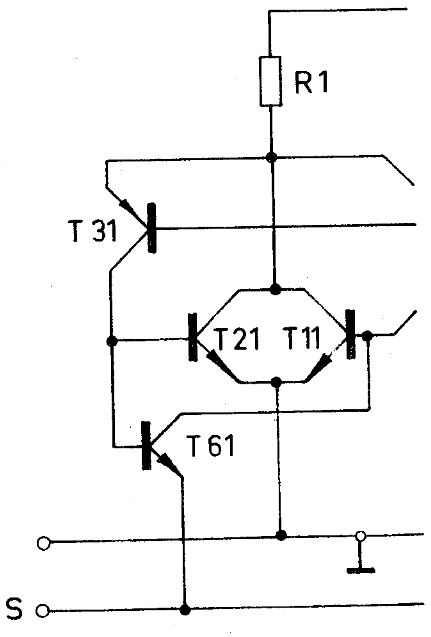
FIG. 7 shows a modification of the circuit according to FIG. 5.

A modified type of circuit for a coupling transistor operated as a transistor, is shown in FIG. 7. In this case, the emitter of the coupling transistor T61 is arranged, just like the emitter of the coupling transistor T41 in FIG. 5, at the control input S, and the base of the coupling transistor is applied to the base of the control transistor. The collector, however, is applied to the base of the switching transistor T11. Accordingly, the collector potential of the coupling transistor T61 has a timely inverse function with respect to the collector potential of the coupling transistor T41 according to FIG. 5.

In the circuits according to FIG. 5 and 7 both the collector and the emitter electrode of the coupling transistors may also be interchanged. The coupling transistors may also be of a conductivity type complementary to that of the control and switching transistors.

If no semiconductor layers or zones are to be used for realizing the capacitors C1 and C2 the latter, in a further embodiment of the invention, may also be designed as metal-oxide-silicon capacitances.

Figure 8:
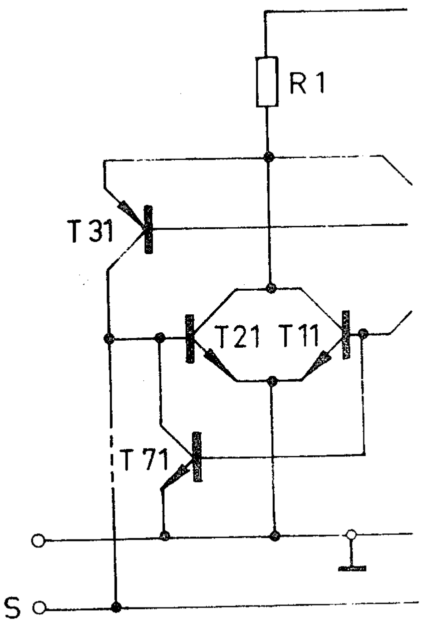
FIG. 8 shows a further embodiment capable of being applied to the circuits according to FIGS. 1 to 7.

In FIG. 8 there is shown a further embodiment of the inventive flip-flop circuit which can be used in all varieties of the circuit explained hereinbefore. Again, for the sake of simplicity, only one half is shown. The circuit of one half is enlarged by employing the additional transistor T71. This transistor is connected in such a way that its emitter is applied to reference potential, that its collector is applied to the base of the control transistor T21, and that its base is connected to the base of the switching transistor T11. Quite depending on their switching condition, the two additional transistors as provided for in the flip-flop circuit, are either unblocked or blocked, and contribute towards a more unambiguous discharge of the capacitors C1 and C2.

Especially in the case of high resistance values, the operating resistors R1 and R2 may be replaced by transistors which are connected as constant-current sources. In the case of bipolar transistors, the collector-emitter path thereof replaces the connection between the switching transistor collectors and the operating voltage $+U_B$, whereas the base electrodes of these transistors are supplied with a constant current.

The operating resistors may also be replaced by field-effect transistors (FET). From this there results the further possibility of operating these FET's either as high-ohmic resistors or likewise as constant-current sources. Junction gate FET's as well as insulated gate FET's in particular metal-oxide field-effect transistors have proved to be suitable to this end.

In so doing, very small currents, in particular, currents of less than 1 $\mu$a, flow across the operating resistors R1 and R2, or through the transistors connected as constant-current sources.

In the case of a monolithic integration of the inventive type of flip-flop circuit it is of a particular advantage to design the auxiliary transistors T31 and T32 as lateral pnp-type transistors, whereas the remaining transistors of the flip-flop circuit are transistors of the conventional npn-type. In this case it is appropriate to design the base zone of the respective auxiliary transistor T31 or T32 of the one flip-flop half simultaneously as a collector zone of the associated npn-type control and switching transistors T12 and T22, or T11 and T21 of the other flip-flop half respectively.

Moreover, the mode of operation of the circuit can be improved when the base-emitter threshold voltage of the transistors employed to act as the auxiliary transistors, is at least by 10 mv smaller than the base-emitter threshold voltage of the transistors used as switching transistors.

The advantages of the inventive type of flip-flop circuit are to be seen especially in the fact that it operates reliably throughout a wide range of operating voltage and throughout a likewise wide range of input pulse amplitude. Moreover, this circuit is still absolutely reliable in operation when very small currents flow through the individual transistors. Even in the case of currents in the order of 100 na there has even been observed a reliable operation. In the case of these small currents flowing in the respective conductive half of the flip-flop, the two switching states are still clearly defined, i.e., the one flip-flop half is in the saturated on condition, while the other half is in the non-conducting off condition.

Based on these advantageous properties and also at minimum currents, the inventive flip-flop circuit, is particularly suitable for serving as the basic building block of a binary counting chain for quartz-controlled clocks. The low total current consumption lying in the order of microamps, for up to 14-stage binary counting chains, enables the conventional so-called button cells, to be used as sources of direct current for operating these clocks. With such a button cell, quartz-controlled wrist watches comprising a binary counting chain built up from the inventive type of flip-flop circuit, can be operated for a period of almost 1 year.

A further range of practical application of the inventive type of flip-flop circuit is to be seen in binary frequency dividers suitable for being used in electronic organs. Here, too, the property of the inventive flip-flop circuit, i.e. its capability of being operated by low currents, is noticeable to a favorable extent. In the same way it is also possible to design digital computers by employing the inventive flip-flop circuit, for serving as the basic building block for counters, shift registers, translators and storage devices, etc.

It is to be understood that the above described embodiments are made by way of example only and are not to be considered as a limitation as to the scope of the invention.

What is claimed is:

1. A monolithic integrated bistable multivibrator circuit including a first and a second identical section, each section containing a switching transistor and a control transistor, said switching transistor and control transistor having emitter, base and collector regions and electrodes, the emitter, base and collector regions of said switching transistor being of the same conductivity type as the respective emitter and base and the collector regions of said control transistor, the collector electrode of said switching transistor being connected to the collector electrode of said control transistor, the emitter electrodes of said switching and control transistors being connected together and coupled to a reference potential, the base electrode of said switching transistor associated with said first section being connected to the collector electrode of the switching transistor associated with said second section, the collector electrodes of said control and switching transistors of each section being coupled to an operating potential via a respective collector resistor, the base electrode of said control transistor of each section being coupled to a common control input, wherein the improvement comprises:

a complementary auxiliary transistor having an emitter, base and collector electrode included in each of said first and second sections; and the collector and emitter electrodes of each auxiliary transistor being coupled respectively to the base and collector electrodes of the control transistor associated with the same section.

2. A multivibrator circuit according to claim 1, wherein the base electrodes of said auxiliary transistors, via at least one resistor, are applied to said reference potential.

3. A multivibrator circuit according to claim 2, wherein the base electrodes of said control transistors in each section is coupled to said common control input via a capacitor.

4. A multivibrator circuit according to claim 3, wherein said capacitor is comprised of a pn-junction operated in the reverse direction.

5. A multivibrator circuit according to claim 3, wherein said capacitor is comprised of a PN-junction operated in the forward direction.

6. A multivibrator circuit according to claim 1, each section further comprising a coupling transistor having a base electrode connected to the base electrode of said control transistor, said coupling transistor having an emitter electrode connected to said common control input and said coupling transistor having a collector electrode connected to the collector electrode of said control transistor.

7. A multivibrator circuit according to claim 6, wherein said control transistor and said coupling transistor are combined to form one double-emitter transistor.

8. A multivibrator circuit according to claim 1, each section further comprising a coupling transistor having a base electrode connected to the base of said control transistor, said coupling transistor having a collector electrode connected to the base of said switching transistor, and said coupling transistor having an emitter electrode connected to said common control input.

9. A multivibrator circuit according to claim 1, each section further comprising a coupling transistor having an emitter electrode connected to said reference potential, said coupling transistor having a collector electrode connected to the base of said control transistor, and said coupling transistor having a base electrode connected to the base electrode of said switching transistor.

10. A multivibrator circuit according to claim 1, wherein the base-emitter threshold voltage of each auxiliary transistor, is at least 10 mv smaller than the base-emitter threshold voltage of each switching transistor.

11. A multivibrator circuit according to claim 1 wherein the base electrode of each auxiliary transistor is respectively coupled to the base electrode of the switching transistor associated with the same section.

12. The multivibrator circuit according to claim 1 wherein the base electrode of each auxiliary transistor is coupled to said reference potential.

* * * * *